United States Patent
Kalbassi et al.

(10) Patent No.: US 6,599,347 B2
(45) Date of Patent: Jul. 29, 2003

(54) PROCESS FOR TREATING A FEED GAS

(75) Inventors: Mohammad Ali Kalbassi, Walton on Thames (GB); Nasim Hassan Malik, London (GB)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 10/057,428

(22) Filed: Jan. 24, 2002

(65) Prior Publication Data
US 2002/0134234 A1 Sep. 26, 2002

(30) Foreign Application Priority Data
Jan. 25, 2001 (EP) .............................. 01300664

(51) Int. Cl.[7] .......................... B01D 53/04; B01D 53/26
(52) U.S. Cl. ................................ 95/10; 95/18; 95/120; 95/123; 95/139; 96/111; 96/112; 96/115; 96/130; 96/143; 62/643
(58) Field of Search ................... 95/10, 14, 18, 95/117–120, 123, 139; 96/111, 112, 115, 130, 143, 144, 146; 62/643

(56) References Cited

U.S. PATENT DOCUMENTS

| | | | | |
|---|---|---|---|---|
| 3,738,084 A | * | 6/1973 | Simonet et al. | 55/31 |
| 4,197,095 A | | 4/1980 | White, Jr. et al. | 55/20 |
| 4,233,038 A | * | 11/1980 | Tao | 55/33 |
| 4,249,915 A | * | 2/1981 | Sircar et al. | 55/26 |
| 4,472,178 A | * | 9/1984 | Kumar et al. | 55/25 |
| 4,504,286 A | * | 3/1985 | Carlisle et al. | 55/20 |
| 4,832,711 A | * | 5/1989 | Christel, Jr. et al. | 55/20 |
| 4,941,894 A | * | 7/1990 | Black | 55/20 |
| 5,137,548 A | * | 8/1992 | Grenier et al. | 55/23 |
| 5,199,964 A | * | 4/1993 | Graff | 55/20 |
| 5,389,125 A | * | 2/1995 | Thayer et al. | 95/11 |
| 5,407,465 A | * | 4/1995 | Schaub et al. | 95/14 |
| 5,474,594 A | * | 12/1995 | Khelifa et al. | 95/14 |
| 5,614,000 A | | 3/1997 | Kalbassi et al. | 95/96 |
| 5,688,305 A | * | 11/1997 | Graeff | 95/14 |
| 5,779,767 A | * | 7/1998 | Golden et al. | 95/96 |
| 5,846,295 A | | 12/1998 | Kalbassi et al. | 95/105 |
| 5,855,650 A | | 1/1999 | Kalbassi et al. | 95/106 |
| 5,914,455 A | * | 6/1999 | Jain et al. | 95/96 |
| 5,989,313 A | * | 11/1999 | Mize | 95/10 |
| 6,048,509 A | * | 4/2000 | Kawai et al. | 95/96 X |
| 6,106,593 A | * | 8/2000 | Golden et al. | 95/120 |
| 6,238,460 B1 | * | 5/2001 | Deng et al. | 95/98 |
| 6,319,303 B1 | * | 11/2001 | Guillard et al. | 95/97 |
| 6,358,302 B1 | * | 3/2002 | Deng et al. | 95/96 |
| 6,402,809 B1 | * | 6/2002 | Monereau et al. | 95/14 |
| 6,471,749 B1 | * | 10/2002 | Kawai et al. | 95/99 |

FOREIGN PATENT DOCUMENTS

| | | |
|---|---|---|
| EP | 0815920 | 1/1998 |
| EP | 0925821 | 7/1999 |
| EP | 1080773 | 3/2001 |

OTHER PUBLICATIONS

European Search Report.

* cited by examiner

Primary Examiner—Robert H. Spitzer
(74) Attorney, Agent, or Firm—Willard Jones, II

(57) ABSTRACT

A method of operating a thermal swing adsorption process by determining a parameter relating to the water content of a feed gas, selecting process conditions for regeneration of the adsorbent in the thermal swing adsorption process based on the parameter and modifying the regeneration process conditions to accord with the selected process conditions for regeneration is disclosed. Apparatus for effecting this adsorption method and apparatus in which regeneration conditions are modified based on the actual ambient water content of the feed gas are also disclosed.

34 Claims, 1 Drawing Sheet

US 6,599,347 B2

PROCESS FOR TREATING A FEED GAS

TECHNICAL FIELD OF THE INVENTION

This invention relates to a process for treating a feed gas. In particular, the invention relates to a process for removing or at least reducing the level of carbon dioxide and water in a feed gas to render it suitable for downstream processing. The invention is especially useful in removing carbon dioxide and water from air which is to be employed as a feed gas in a process for the cryogenic separation or purification of air.

BACKGROUND OF THE INVENTION

Carbon dioxide is a relatively high boiling gaseous material and removal of this and other high boiling materials for example water which may be present in a feed gas is necessary where the mixture is to be subsequently treated in a low temperature, for example cryogenic, process. If relatively high boiling materials are not removed, they may liquefy or solidify in subsequent processing and lead to pressure drops and flow difficulties in the downstream process. It may also be necessary or desirable to remove hazardous, for instance explosive materials prior to further processing of the feed gas so as to reduce the risk of build-up in the subsequent process thereby presenting an explosion hazard. Hydrocarbon gases, for example acetylene, may present such a hazard.

Several methods are known for removing carbon dioxide and water from a feed gas by adsorption on to a solid adsorbent including temperature swing adsorption (TSA) and pressure swing adsorption (PSA), thermal pressure swing adsorption (TPSA) and thermally enhanced pressure swing adsorption (TEPSA).

Generally, in these processes water and carbon dioxide are removed from a feed gas by contacting the mixture with one or more adsorbents which adsorb water and carbon dioxide. The water adsorbent material may be for example silica gel, alumina or a molecular sieve and the carbon dioxide adsorbent material may typically be a molecular sieve, for example a zeolite. It is conventional to remove water first and then carbon dioxide by passing the feed gas through a single adsorbent layer or separate layers of adsorbent selected for preferential adsorption of water and carbon dioxide in a column. Removal of carbon dioxide and other high boiling components to a very low level is especially desirable for the efficient operation of downstream processes.

After adsorption, the flow of feed gas is shut off from the adsorbent bed and the adsorbent is exposed to a flow of regeneration gas which strips the adsorbed materials for example carbon dioxide and water from the adsorbent and so regenerates it for further use.

In a TSA process for carbon dioxide and water removal, atmospheric air is typically compressed using a main air compressor (MAC) followed by water-cooling and removal of the thus condensed water in a separator. The air may be further cooled using for example refrigerated ethylene glycol. The bulk of the water is removed in this step by condensation and separation of the condensate. The gas is then passed to a molecular sieve bed or mixed alumina/molecular sieve bed system where the remaining water and carbon dioxide are removed by adsorption. By using two adsorbent beds in a parallel arrangement, one may be operated for adsorption while the other is being regenerated and their roles are periodically reversed in the operating cycle. In this case, the adsorbent beds are operated in a thermal swing mode with equal periods being devoted to adsorption and to regeneration.

As the component which is being removed from the feed gas is adsorbed while the bed is on-line the adsorption process will generate heat of adsorption causing a heat pulse to progress downstream through the adsorbent. The heat pulse is allowed to proceed out of the downstream end of the adsorbent bed during the feed or on-line period. During the regeneration process, heat must be supplied to desorb the gas component which has been adsorbed on the bed. In the regeneration step, part of the product gas, for instance nitrogen or a waste stream from a downstream process, is used to desorb the adsorbed components and may be compressed in addition to being heated. The hot gas is passed through the bed being regenerated so removing the adsorbed carbon dioxide and/or water. Regeneration conventionally is carried out in a direction counter to that of the adsorption step.

In a PSA system, cycle times are usually shorter than in a TSA system, but feed temperature and pressure and the regeneration gas often are similar. However in PSA systems, the pressure of the regeneration gas is lower than that of the feed gas and the change in pressure is used to remove the carbon dioxide and water from the adsorbent. Regeneration is suitably commenced before the heat pulse mentioned above in relation to TSA has reached the downstream end of the bed. The direction of the heat pulse is reversed by the process of regeneration and the heat which derived from the adsorption of the gas component in question is retained in the bed and used for desorbing that component during regeneration. In contrast to TSA one thus avoids having to heat the regeneration gas.

Thermal pressure swing adsorption (TPSA) is also suitable for removing carbon dioxide and water from the feed gas. In a TPSA system water is typically confined to a zone in which a water adsorption medium is disposed for example activated alumina or silica gel. A separate layer comprising a molecular sieve for the adsorption of carbon dioxide is typically employed and the molecular sieve layer and the zone for adsorption of water conventionally are separate. By contrast with a TSA system water does not enter the molecular sieve layer to any significant extent which advantageously avoids the need to input a large amount of energy in order to desorb the water from the molecular sieve layer. A TPSA process is described in U.S. Pat. No. 5,885,650 and U.S. Pat. No. 5,846,295.

Thermally enhanced PSA (TEPSA), like TPSA, utilises a two stage regeneration process in which carbon dioxide previously adsorbed is desorbed by TSA and adsorbed water is desorbed by PSA. In this process, desorption occurs by feeding a regeneration gas at a pressure lower than the feed stream and a temperature greater than the feed stream and subsequently replacing the hot regeneration gas by a cold regeneration gas. The heated regenerating gas allows the cycle time to be extended as compared to that of a PSA system so reducing switch losses as heat generated by adsorption within the bed may be replaced in part by the heat from the hot regeneration gas. A TEPSA process is described in U.S. Pat. No. 5,614,000.

In contrast to PSA, TSA, TEPSA and TPSA all require the input of thermal energy by means of heating the regeneration gas but each procedure has its own characteristic advantages and disadvantages. The temperatures needed for the regenerating gas are typically sufficiently high, for example 100° C. to 200° C., as to place demands on the system engineering which increases costs. Typically, there will be more than one unwanted gas component which is removed in the process and generally one or more of these components will adsorb strongly for example water, and another much more weakly for example carbon dioxide. The high temperature used for regenerating needs to be sufficient for the desorption of the more strongly adsorbed component.

The high temperature employed in a TSA, TPSA and TEPSA systems may require the use of insulated vessels, a regeneration gas preheater and an inlet end precooler and generally the high temperatures impose a more stringent and costly mechanical specification for the system. In operation, there is extra energy cost associated with using the purge preheater.

The PSA system avoids many of these disadvantages by avoiding the need for coping with high temperatures, although the short cycle time which characterises PSA brings its own disadvantages.

EP-A-925821 describes a method for operation of a pressure swing adsorber in a PSA process air pre-purifier which takes into account inlet air conditions. The object of the invention in EP-A-925821 is to provide an improved method for controlling the cycle time of a PSA air pre-purifier and continuous control is exerted depending on parameters of inlet air feed. Air feed conditions are monitored to ascertain the moisture content of air being fed into the adsorber. EP-A-925821 is not concerned with TSA, TPSA or TEPSA processes.

In designing a TSA, TEPSA or TPSA system, one conventionally takes account of ambient prevailing conditions in the locality in which the process is to be operated as the level of water in the feed gas changes according to variations in local temperature and relative humidity. These factors vary on a continuous basis and daily or seasonal differences may be high and hence the level of water in the feed gas may vary considerably. Conventionally, operating parameters in TSA, TEPSA and TPSA processes have been selected to take account of the most adverse ambient conditions likely to be encountered to ensure efficient operation of the process. The process conditions are pre-selected and remain constant during operation in order to ensure that the feed gas having the highest likely content of water may be processed without risk of exceeding the capacity of the system to remove water and so avoiding water being passed to a downstream process.

SUMMARY OF THE INVENTION

The inventors have now found that TSA, TEPSA and TPSA systems need not be operated under constant conditions sufficient to cope with the most adverse ambient conditions likely to be encountered as is presently the norm but, surprisingly, the process operating conditions may be varied according to fluctuations in the ambient conditions by measuring one or more parameters relating to the composition of the feed gas to provide major energy savings yet still operate the process efficiently.

DETAILED DESCRIPTION OF THE INVENTION

Figure 1:
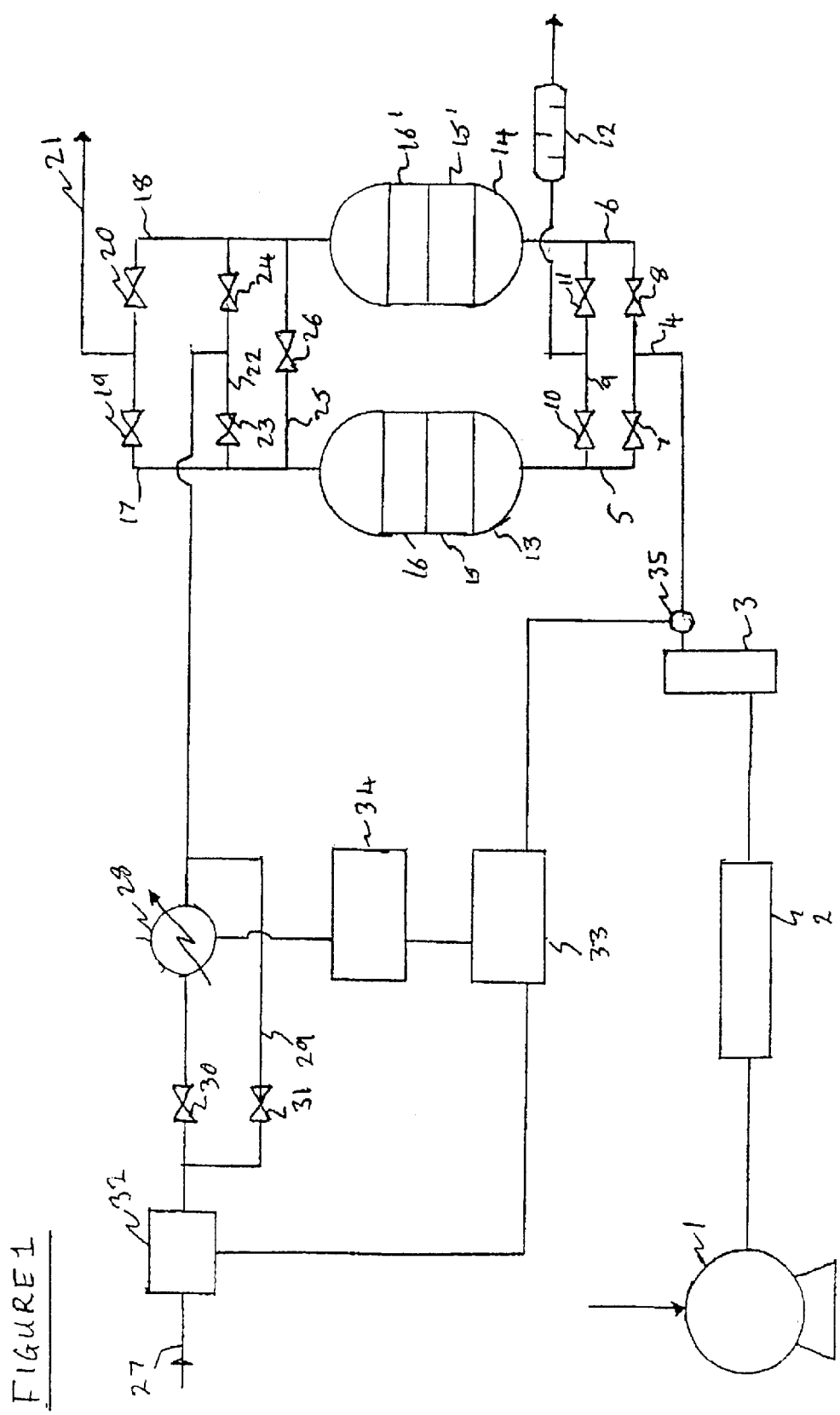
FIG. 1 schematically represents a preferred embodiment of apparatus according to the invention which is suitable for use in a process according to a preferred embodiment of the invention.

Accordingly, a first aspect of the invention provides a method of operating a thermal swing adsorption process which comprises determining directly or indirectly one or more parameters relating to the water content of a feed gas comprising water and carbon dioxide in a thermal swing adsorption process in which water and carbon dioxide are removed by adsorption onto at least one adsorbent, selecting process conditions for regeneration of the at least one adsorbent in the thermal swing adsorption process based on said parameters and modifying the regeneration process conditions to accord with the selected process conditions for regeneration such that adsorbed water and carbon dioxide is desorbed thereby regenerating the at least one adsorbent.

The process conditions for regeneration are selected so as to enable complete regeneration of the adsorbent and are based on the actual water content of the feed gas as determined. The selected process conditions for regeneration are generally not sufficient to regenerate the adsorbent under the most adverse ambient conditions prevailing in the environment of the plant in which the process is operated unless the actual ambient conditions correspond to the most adverse ambient conditions. Those skilled in the art will be able to determine the most adverse ambient conditions in any given location, for example in the manner that such conditions would be determined in designing and operating a conventional TSA process.

Advantageously this method requires less thermal energy to be consumed in the process than would be consumed under the conventional operating regime. Furthermore, the power requirements of a main air compressor typically employed in TSA processes in an air separation unit may be significantly reduced compared to that in conventional operation.

In another aspect the invention provides a method of operating a gas separation unit, for example an air separation unit, comprising a gas compressor, for example a main air compressor, adsorption apparatus in which adsorption and regeneration is successively carried out in fluid communication with the compressor and a low temperature separation apparatus in fluid communication with the adsorption apparatus in which the gas compressor is operated so as to reduce the energy consumed therein by adjusting the regeneration process conditions in the adsorption apparatus in response to the humidity of the gas to be separated.

The adsorption and regeneration is suitably carried out by a thermal swing adsorption process as described according to the first aspect of the invention hereinabove.

Determining the actual water content of the feed gas rather than relying on the assumed higher content found under the most adverse ambient conditions permits the process to be operated with a reduced input of energy with the energy saving being that which would otherwise have been expended to take account of the difference in the actual water content and the theoretical maximum water content under most adverse ambient conditions. Accordingly a larger proportion of the energy input to the process serves to regenerate the adsorbent so providing environmental benefits of reduced energy requirements and reduced wastage as well as economic benefits.

By the term "thermal swing adsorption" we mean adsorption processes in which thermal energy is input to regenerate the adsorbent and includes TPSA and TEPSA processes in addition to TSA unless otherwise stated.

The feed gas may be any gas containing carbon dioxide and water and may be natural gas or synthetic gas. In a preferred embodiment, the feed gas is air. After treatment, the gas is suitably subjected to a downstream process of cryogenic separation especially for the recovery of oxygen and/or nitrogen.

The feed gas is suitably treated by contacting with an adsorbent in a first zone so as to remove the water prior to removal of carbon dioxide in a second zone suitably on a second adsorbent. Suitable adsorbents include, alumina, silica gel, activated alumina, impregnated alumina, and molecular sieves, for example type A and type X zeolites.

The water adsorbent material is preferably silica gel, activated alumina, impregnated alumina or alumina and the carbon dioxide adsorbent material may be a molecular sieve for example, a zeolite. The zeolite may be bound or binderless. Preferably, the zeolite is zeolite 13X and more preferably binderless zeolite 13X.

Preferably, the water adsorbent and carbon dioxide adsorbent are arranged in a composite bed with the carbon dioxide adsorbent downstream of the water adsorbent although separate beds may be employed if desired.

Carbon dioxide may be present in the feed gas at any level but the invention is of especial applicability where the level of carbon dioxide is less than 1000 ppm and especially below 400 ppm.

The TSA, TPSA or TEPSA process may be operated using a single flow path but preferably is operated using at least two parallel flow paths so as to allow the process to be operated in a cyclical manner comprising adsorption and desorption with the separate flow paths being cycled out of phase to provide a pseudo-continuous flow of feed gas from the process.

The feed gas is suitably fed to the adsorption step at a temperature of −50 to 80° C. and preferably 0 to 60° C., especially 10 to 50° C. Suitably the pressure of the feed gas is at least 100000 N/m$^2$, preferably 200000 to 4000000 more preferably 200000 to 3000000 and desirably 200000 to 1500000 N/m$^2$.

In a cyclical process, the feed gas is introduced into an adsorption zone and contacted with the adsorbent, suitably in the form of a bed. As the mixture passes through the adsorbent, suitably water, carbon dioxide and optionally other high boiling components are adsorbed and the remaining gas then passes out of the adsorption zone. During the process a front of the gas to be adsorbed forms in the adsorbent and passes through it. As desired, the adsorption step is then terminated and the adsorption zone is then heated and optionally subjected to a reduced pressure and the adsorption zone is purged of the adsorbed gas during regeneration by feeding a regeneration gas to the zone.

The adsorption step is suitably operated in a conventional manner known to those skilled in the art.

Preferably, the regeneration gas comprises a gas recycled from a downstream process, for example a nitrogen-rich waste gas stream from an air separation plant which is dry and free of carbon dioxide. The regeneration of the adsorbent is carried out at a temperature above the bed adsorption temperature, suitably at a temperature of 80 to 400° C., preferably from 100 to 250° C.

Suitably, the regeneration pressure is 10000 to 3000000 N/m$^2$ and preferably 50000 to 1000000 N/m$^2$. It is especially desirable that the regeneration pressure does not exceed 50 percent of the pressure of the feed gas.

Preferably, the process is operated with a molar flow of regenerating gas to the feed gas of 0.1 to 0.8 more preferably 0.2 to 0.5.

The regeneration process conditions which are modified in response to the one or more parameters relating to the water content of the feed gas suitably include the flow rate of the regeneration gas and its temperature.

Suitably, in a TSA process the feed gas is fed to the adsorption zone for a period of 60 to 600 minutes and preferably 70 to 300 minutes. In a TEPSA process the feed gas is suitably fed to an adsorption unit zone for a period of 10 to 80 minutes and preferably 20 to 60 minutes.

In a preferred embodiment, the invention provides a method for the reduction of the level of carbon dioxide and water in a feed gas comprising, passing the feed gas to an adsorption zone containing an adsorbent, contacting the gas with said adsorbent so as to remove water and carbon dioxide from the gas and passing the gas depleted in water and carbon dioxide to a cryogenic separation process in which at least one of the components of the gas depleted in carbon dioxide and water is recovered wherein the adsorbent is regenerated by heating after adsorption according to pre-determined regeneration conditions said regeneration process comprising determining directly or indirectly one or more parameters relating to the water content of the gas prior to contact with the adsorbent, selecting process conditions for regeneration of the adsorbent in response to said one or more parameters and modifying the regeneration process conditions to accord with the selected process conditions for regeneration.

The feed gas may be natural gas, synthetic gas and is preferably air.

In another preferred embodiment, the invention provides a method of operating an air separation unit comprising a main air compressor, adsorption apparatus containing an adsorbent for adsorbing water and carbon dioxide and a cryogenic separation apparatus, said compressor, adsorption apparatus and separation apparatus being arranged in sequential fluid communication which method comprises compressing air in the compressor, passing compressed air to the adsorption apparatus so as to remove water and carbon dioxide from the air and passing the air depleted in water and carbon dioxide to the cryogenic separation apparatus in which at least one of the components of the gas depleted in carbon dioxide and water is recovered wherein:

i) the adsorbent is regenerated by heating after adsorption according to pre-determined regeneration conditions said regeneration comprising determining directly or indirectly one or more parameters relating to the water content of the air prior to contact with the adsorbent, selecting process conditions for regeneration of the adsorbent in response to said one or more parameters and modifying the regeneration process conditions to accord with the selected process conditions for regeneration; and ii) the air is compressed using less power than required when regenerating the adsorbent under constant conditions which are sufficient to regenerate the adsorbent under the most adverse ambient conditions.

The method of operating an air separation unit provides a significant reduction in the power used by the main air compressor to compress the air feed. Suitably, the power used by the air compressor is at least 1%, for example from 1 to 4%, and preferably at least 2.5% less than the power used when regenerating the adsorbent under constant conditions which are sufficient to regenerate the adsorbent under the most adverse ambient conditions.

The term "most adverse ambient conditions" means those conditions that are most adverse to the operation of an air separation process at the location at which the process is operated and typically will include the maximum temperature and humidity at that location.

In another aspect, the invention provides TSA process control apparatus for modifying regeneration process conditions in a TSA process in which a feed gas is fed to an adsorbent, water and carbon dioxide are adsorbed on the adsorbent thereby depleting the gas in water and carbon dioxide and the adsorbent is regenerated by contacting a heated regeneration gas with the adsorbent so as to desorb at least part of the adsorbed carbon dioxide and water, which apparatus comprises regeneration process condition control means, sensor means for determining one or more parameters relating to the water content of the feed gas and control means capable of receiving information relating to said one or more parameters from the sensor means, calculating process conditions required to provide sufficient energy to effect desorption of the adsorbed carbon dioxide and optionally water based on the information received from said sensor means and sending a signal to the regeneration process condition control means to modify the process conditions to accord with the calculated conditions.

Suitably the regeneration process control means comprises flow control means for controlling the flow of regeneration gas and/or temperature control means for controlling the heating of the regeneration gas.

The invention also provides TSA apparatus comprising a first adsorption vessel and a second adsorption vessel, a feed gas inlet assembly in fluid communication with both vessels, an outlet assembly in fluid communication with both vessels the vessels being arranged in parallel paths, flow control means to permit the feed gas to pass alternately through each vessel and to the outlet assembly, a regeneration assembly comprising a conduit in fluid communication with the outlet assembly and a heater whereby a heated regeneration gas is able to be passed into the vessels alternately and TSA process control means as herein described arranged so as to determine one or more parameters relating to the water content of a feed gas to be fed to the inlet assembly and, to modify the regeneration process conditions based on said parameters.

In FIG. 1, air to be purified is fed to a main air compressor (MAC), 1, in which it is compressed and then fed to a cooler, 2 so as to condense at least some of the water vapour from the cooled compressed air. The compressed cooled air is fed to a separator, 3, which acts to remove water droplets from the feed. The separator is connected to an inlet, 4, in which the flow path divides into two paths, 5 and 6, having inlet control valves, 7 and 8 respectively. Downstream of the control valves, 7 and 8, the inlet paths, 5 and 6, are bridged by a vent, 9, containing vent valves, 10 and 11. A silencer, 12, is connected to the vent, 9. Adsorption vessels, 13 and 14, are connected to the two inlet paths, 5 and 6, downstream of the vent, 9. Each vessel, 13 and 14, contains an adsorbent bed typically containing two adsorbents, 15 and 16 and 15' and 16' respectively. The upstream portion of the adsorbent beds, 15 and 15', contains an adsorbent for removing water, for example activated alumina or modified alumina and the downstream portion of the adsorption beds, 16 and 16', contains adsorbent for the removal of carbon dioxide, for example zeolite. Outlet paths, 17 and 18, are connected to each adsorption vessel, 13 and 14, and have outlet control valves, 19 and 20. The separate outlet paths, 17 and 18 join downstream of the control valves, 19 and 20, to provide a single outlet, 21, which suitably is connected to downstream processing apparatus for example a cryogenic air separator (not shown). Upstream of the outlet control valves, 19 and 20, the outlet paths, 17 and 18, are bridged by a regenerating gas inlet, 22, the bridge containing regenerating gas control valves, 23 and 24. A further bridging line, 25, upstream from the regenerating gas inlet, 22, also contains a control valve, 26.

The regenerating gas inlet, 22, is connected to apparatus for supplying the regenerating gas which contains a regenerating gas feed, 27, which may pass either through a heater, 28, or through a bypass line, 29, to the regenerating gas inlet, 22. Control valves, 30 and 31, are provided to control the flow and path of the regeneration gas. The regeneration gas suitably is obtained from the downstream processing apparatus fed by outlet 21.

Suitably any or all of the valves are controllable by means of programmable timing means and valve opening means known in the art which are not illustrated for the sake of clarity.

A flow indicator control 32 is provided in the regenerating gas feed, 27, to measure and control the flow of the regenerating gas to the inlet, 22. The flow indicator controller, 32, is linked to a temperature indicator controller, 33, which is linked to a heat sequencer, 34 for controlling the heating of the regenerating gas. A temperature sensor, 35, is linked to the temperature indicator controller, 33, and is located so as to be able to measure the temperature of the feed gas. As the feed gas is at this point saturated with water (RH=100%) the temperature provides the water content of the feed gas. Other means of measuring one or more parameters relating to the water content of the feed gas which is passed to the inlet, 4, may be used.

In use, air is compressed in the MAC, 1, and then fed to the inlet, 4, via the cooler 2 and separator 3, and passes through one of the two adsorbent vessels, 13 and 14, (the "on-line" vessel) in the downstream direction. The other adsorbent vessel, receives regenerating gas from inlet 22 which flows in the opposite direction to the flow of air in the first adsorption vessel.

With vessel 13 on-line, air passes through open valve 7 to vessel 13 and through open valve 19 to the outlet 21 for downstream processing. Valve 8 is closed as adsorption vessel 14 is cut off from the air feed. Valves 20, 23, 24, 26, 10 and 11 are all closed. To commence regeneration of the bed in adsorption vessel 14, valve 11 is opened to depressurise the vessel 14 and valve 24 is opened to allow a flow of regenerating gas to pass through adsorption vessel 14. The regenerating gas typically will be a flow of dry, carbon dioxide-free nitrogen obtained from a downstream processing unit, for example the cold box of an air separation unit. The valve 30 is opened to allow regenerating gas to pass through the heater 28 and to be heated for instance to a temperature of 100° C. or more prior to passing into vessel 14 at the required temperature. As the regenerating gas passes through the vessel 14 carbon dioxide is desorbed and a heat wave passes through the adsorbent bed 16'. At the appropriate time, for example as the heat wave passes into bed 15', valve 30 is closed and valve 31 is opened so the regenerating gas is not heated and passes into the vessel 14 and displaces the heat pulse further through the adsorbent 15'.

Whilst the adsorbent 16' has been regenerated by TSA, the cool regenerating gas, by virtue of its reduced pressure desorbs water from the adsorbent 15' by PSA and, depending on whether the heat wave has passed into the adsorbent 15', also by TSA.

At the end of the regeneration period, valve 24 is closed and valve 26 is opened to displace regeneration gas from the bed in vessel 14. Valve 11 is then closed so as to repressurise vessel 14 with purified air. Valve 26 is then closed and valves 8 and 20 are opened whereby vessel 14 is placed on-line. The vessel 13 may then be regenerated in a similar manner to the process described above, with the vessels 13 and 14 being on-line, depressurising, regenerating, repressurising and returning to on-line operation in phased cycles of operation.

The parameter determined by sensor, 35, is fed to the temperature indicator controller, 33, which, depending on the information received from the sensor, 35, calculates an appropriate flow rate and temperature for the regenerating gas based on the water content of the feed gas and by means of the flow indicator control, 32, and the heat sequencer, 34, modifies the flow rate and/or temperature of the regenerating gas. The sensor 35 may determine parameters of the gas continuously or periodically, for example hourly and daily and the flow and/or temperature of the regenerating gas are modified in response to this data.

The invention is illustrated by the following non-limiting examples.

EXAMPLE 1

Comparative Examples A and B
Fixed Cycle Time, Variable Heater Duty

An adsorption process according to the invention was carried out using apparatus as set out in FIG. 1 and according to the process parameters set out in Table 1. For comparative purposes a TPSA process and a TSA process were also carried out but without determining the water content of the feed gas and operating with regeneration process conditions set according to the most adverse ambient conditions.

Table 1, shows the benefits of employing the process of the invention as compared to a conventional TPSA process (Comparative A) and conventional TSA technology (Comparative B). The process of Example 1 which is based on a yearly or seasonally averaged ambient system (P/A= 0.5) results in a 42% power reduction over TPSA and 78% power reductions over conventional TSA.

TABLE 1

| Parameter | Units | Comparative B | Example 1 | Comparative A |
|---|---|---|---|---|
| Air Flow | $Nm^3/h$ | 130000 | 130000 | 130000 |
| Pressure | $N/m^2$ | 520000 | 520000 | 520000 |
| Purge Pressure | $N/m^2$ | 110000 | 110000 | 110000 |
| Feed Temp | ° C. | 40 | 30 | 40 |
| On Line (Excluding Regen) | min | 177.0 | 117.00 | 117.00 |
| Heat Time | min | 55 | 43.00 | 43.00 |
| Max Pulse Temp | ° C. | 210 | 70.00 | 110.00 |
| P/A | — | 0.50 | 0.50 | 0.50 |
| Heat Required | kW | 1109.06 | 248.63 | 428.67 |
| Regen Power Utilisation | $kW/Nm^3 \cdot h\ air$ | 0.00853 | 0.00191 | 0.00330 |
| Ratio Supplied/Desorption Heat | — | 1.1000000 | 0.4000000 | 0.4000000 |

Due to the reduced pressure in TPSA operation as compared to TSA, less heat is required for regeneration of a comparable adsorbent. Accordingly the process may be operated with a shorter "on-line" time at a given flow rate. Further, the feed temperature in Example 1 was measured as 30° C. whereas in the Comparative Examples, a feed temperature of 40° C. was assumed, reflecting the most adverse ambient conditions. Accordingly the heat required for regeneration in Example 1 is much less than that in the Comparative Examples A and B permitting a lower maximum pulse temperature and, as compared to Comparative Example B, a much shorter "on-line" time. In short a lower level of heat was required for a shorter period of time to effect regeneration as a result of modifying the regeneration process conditions based on the actual water content of the feed rather than the estimated content under most adverse ambient conditions.

EXAMPLE 2

Comparative C
Variable Cycle Time, Variable P/A Ratio

An adsorption process according to the invention was carried out using the apparatus set out in Table 2. For comparative purposes a TEPSA process was operated using the same apparatus but without determining the water content of the feed gas.

TABLE 2

| Parameter | Units | Example 2 | Comparative C |
|---|---|---|---|
| Air Flow | $Nm^3/h$ | 130000 | 130000 |
| Pressure | $N/m^2$ | 520000 | 520000 |
| Purge Side Bed & Circuit Pressure Drop | $N/m^2$ | 5172 | 20700 |
| Feed Temp | ° C. | 21 (winter) | 40 (peak summer) |
| On Line | min | 169.00 | 117.00 |
| Heat Time | min | 43.00 | 43.00 |
| Max Pulse Temp | ° C. | 130.00 | 110.00 |
| P/A | — | 0.25 | 0.50 |
| Heat Required | kW | 290.84 | 428.67 |
| Regen Power Utilisation | $kW/Nm^3 \cdot h\ air$ | 0.00224 | 0.00330 |
| Ratio Supplied/Desorption Heat | — | 0.2900000 | 0.4000000 |
| MAC Power Including Regeneration Circuit | kW | 8699 | 9176 |
| Seasonally Adjusted MAC Power Reduction Due to Regeneration Circuit | kW | 238 | 0.000 |

The figure for the yearly adjusted power reduction assumes that the process is operated with reduced MAC power for 50% of the time.

The quantity of the adsorbent in an air purification system is determined based on worse feed conditions or water loading experienced in the most adverse conditions, typically the peak of summer. In TPSA and TEPSA, when the feed gas is below the peak feed temperature it will be loaded with less water. The results in Table 2 show that the cooling period may be increased and/or the P/A ratio may be reduced by using the present invention. As the frequency of the heater usage is reduced the overall power utilisation will also be reduced. The results demonstrate that the power load may be reduced by over 30% by employing the present invention.

In Example 2, less heat is required so permitting the heat pulse to move through the adsorbent more slowly than in Comparative Example C at a constant heating time. The reduced flow enables, surprisingly, a higher regeneration temperature to be employed yet still satisfy a significantly reduced overall heat requirement.

By adjusting the P/A ratio, Example 2 demonstrates that power reduction of the main air compressor (MAC) may also be achieved. In a downstream process of cryogenic air purification by distillation air is compressed in the main air compressor (MAC) and then cooled, passed through an adsorbent bed and then to a cryogenic air separation unit. The regeneration gas typically derives from the waste stream from the cryogenic distillation system. The pressure drop of this circuit has multiplying impact on the MAC power of the order of three times. By operating the process at a lower P/A ratio, less MAC energy is required due to the reduced purge flow and so reduced loss of compressed air. The MAC power requirements, in a large air separation unit are shown in Table 2 and the present invention provides a reduced MAC power requirement.

This example illustrates that seasonally adjusted savings of the order of 2.5% MAC power is achievable. This saving is in addition to benefits of reducing regeneration power.

What is claimed is:

1. A method of operating a thermal swing adsorption process which comprises determining directly or indirectly one or more parameters relating to the water content of a feed gas comprising water and carbon dioxide, in a thermal swing adsorption process in which water and carbon dioxide are removed by adsorption onto at least one adsorbent, selecting process conditions for regeneration of the at least one adsorbent in the thermal swing adsorption process such that a heat pulse passes through at least a part of the adsorbent during regeneration but does not emerge from the adsorbent based on said parameters and modifying the regeneration process conditions to accord with the selected process conditions for regeneration such that adsorbed water and carbon dioxide is desorbed thereby regenerating the at least one adsorbent.

2. The method of claim 1 in which the feed gas is selected from synthetic gas, natural gas and air.

3. The method of claim 2 in which the feed gas is air.

4. The method of claim 1 in which the adsorbent is selected from alumina, silica gel, activated alumina, impregnated alumina, and a molecular sieve.

5. The method of claim 4 comprising a first adsorbent selected from silica gel, activated alumina, impregnated alumina and alumina and a second, downstream adsorbent comprising a zeolite.

6. The method of claim 5 in which the zeolite is zeolite X.

7. The method of claim 1 in which the feed gas is at a temperature of −50 to 80° C.

8. The method of claim 7 in which the feed gas is at a temperature of 10 to 50° C.

9. The method of claim 1 in which the regeneration of the adsorbent is carried out at a temperature of 80 to 400° C.

10. The method of claim 1 in which the adsorbent is regenerated by means of a regeneration gas and the molar ratio of regeneration gas to feed gas is 0.1 to 0.8.

11. The method of claim 1 in which a regeneration gas at a pressure of 50000 to 1000000 N/m$^2$ is used for regeneration.

12. The method of claim 1 in which the feed gas is at a pressure of 200000 to 4000000 N/m$^2$.

13. The method of claim 12 in which the feed gas is at a pressure of 200000 to 1500000 N/m$^2$.

14. The method of claim 1 in which the feed gas is at a temperature of 10 to 50° C. and a pressure of 200000 to 1500000 N/m$^2$.

15. A method for the reduction of the level of carbon dioxide and water in a feed gas comprising, passing the feed gas to an adsorption zone containing an adsorbent, contacting the gas with said adsorbent so as to remove water and carbon dioxide from the gas and passing the gas depleted in water and carbon dioxide to a cryogenic separation process in which at least one of the components of the gas depleted in carbon dioxide and water is recovered wherein the adsorbent is regenerated in a regeneration process by heating after adsorption according to pre-determined regeneration conditions, the regeneration process comprising determining directly or indirectly one or more parameters relating to the water content of the gas prior to contact with the adsorbent, selecting process conditions for regeneration of the adsorbent such that a heat pulse passes through at least a part of the adsorbent during regeneration but does not emerge from the adsorbent in response to said one or more parameters and modifying the regeneration process conditions to accord with the selected process conditions for regeneration.

16. The method of claim 15 in which the feed gas is selected from natural gas, synthetic and air.

17. The method of claim 15 in which the feed gas is air.

18. The method of claim 15 in which the adsorbent is selected from alumina, silica gel, activated alumina, impregnated alumina, and a molecular sieve.

19. The method of claim 15 comprising a first adsorbent selected from silica gel, activated alumina, impregnated alumina and alumina and a second, downstream adsorbent comprising a zeolite.

20. The method of claim 19 in which the zeolite is zeolite X.

21. The method of claim 15 in which the feed gas is at a temperature of −50 to 80° C.

22. The method of claim 21 in which the feed gas is at a temperature of 10 to 50° C.

23. The method of claim 15 in which the regeneration of the adsorbent is carried out at a temperature of 80 to 400° C.

24. The method of claim 15 in which the adsorbent is regenerated by means of a regeneration gas and the molar ratio of regeneration gas to feed gas is 0.1 to 0.8.

25. The method of claim 24 in which the regeneration gas is at a pressure of 50000 to 1000000 N/m$^2$.

26. The method of claim 15 in which the feed gas is at a pressure of 200000 to 4000000 N/m$^2$.

27. The method of claim 26 in which the feed gas is at a pressure of 200000 to 1500000 N/m$^2$.

28. The method of claim 15 in which the feed gas is at a temperature of 10 to 50° C. and a pressure of 200000 to 1500000 N/m$^2$.

29. A method of operating an air separation unit comprising a main air compressor, adsorption apparatus containing an adsorbent for adsorbing water and carbon dioxide and a cryogenic separation apparatus, the compressor, adsorption apparatus and separation apparatus being arranged in sequential fluid communication which method comprises compressing air in the compressor, passing compressed air to the adsorption apparatus so as to remove water and carbon dioxide from the air and passing the air depleted in water and carbon dioxide to the cryogenic separation apparatus in which at least one of the components of the gas depleted in carbon dioxide and water is recovered wherein:

i) the adsorbent is regenerated in a regeneration process by heating after adsorption according to pre-determined regeneration conditions, the regeneration process comprising determining directly or indirectly one or more parameters relating to the water content of the air prior to contact with the adsorbent, selecting process conditions for regeneration of the adsorbent such that a heat pulse passes through at least a part of the adsorbent during regeneration but does not emerge from the adsorbent in response to said one or more parameters and modifying the regeneration process conditions to accord with the selected process conditions for regeneration; and ii) the air is compressed using less power than required when regenerating the adsorbent under constant conditions which are sufficient to regenerate the adsorbent under the most adverse ambient conditions.

30. The method of claim 29 in which the power used by the air compressor is at least 1% less than the power used when regenerating the adsorbent under constant conditions which are sufficient to regenerate the adsorbent under the most adverse ambient conditions.

31. The method of claim 30 in which the power used by the air compressor is at least 2.5% less than the power used when regenerating the adsorbent under constant conditions which are sufficient to regenerate the adsorbent under the most adverse ambient conditions.

32. Process control apparatus for modifying regeneration process conditions in a TSA process in which a feed gas is fed to an adsorbent, water and carbon dioxide are adsorbed on the adsorbent thereby depleting the gas in water and carbon dioxide and the adsorbent is regenerated by contacting a heated regeneration gas with the adsorbent so as to desorb at least part of the adsorbed carbon dioxide and water and wherein a heat pulse from the heated regeneration gas passes through at least a part of the adsorbent during regeneration but does not emerge from the adsorbent, which apparatus comprises regeneration process condition control means, sensor means for determining one or more parameters relating to the water content of the feed gas and control means capable of receiving information relating to said one or more parameters from the sensor means, calculating process conditions required to provide sufficient energy to effect desorption of the adsorbed carbon dioxide and water such that a heat pulse passes through at least a part of the adsorbent during regeneration but does not emerge from the adsorbent based on the information received from said sensor means and sending a signal to the regeneration process condition control means to modify the process conditions to accord with the calculated conditions.

33. The apparatus of claim 32 in which the regeneration process control means comprises flow control means for controlling the flow of regeneration gas and/or temperature control means for controlling the heating of the regeneration gas.

34. Apparatus comprising a first adsorption vessel and a second adsorption vessel, a feed gas inlet assembly in fluid communication with both vessels, an outlet assembly in fluid communication with both vessels, the vessels being arranged in parallel paths flow control means to permit the feed gas to pass alternately through each vessel and to the outlet assembly, a regeneration assembly comprising a conduit in fluid communication with the outlet assembly and a heater whereby a heated regeneration gas is able to be passed into the vessels alternately and TSA process control apparatus arranged so as to determine one or more parameters relating to one or more of the water content of a feed gas and the carbon dioxide content of a feed gas to be fed to the inlet assembly and to modify the regeneration process conditions such that during regeneration a heat pulse passes through at least a part of an adsorbent disposed in the adsorption vessel but does not emerge from the adsorbent based on said parameters which process control apparatus comprises regeneration process condition control means, sensor means for determining one or more parameters relating to one or more of the water content and the carbon dioxide content of the feed gas and control means capable of receiving information relating to said one or more parameters from the sensor means, calculating process conditions required to provide sufficient energy to effect desorption of the adsorbed carbon dioxide and water such that during regeneration a heat pulse passes through at least a part of an adsorbent disposed in the adsorption vessel but does not emerge from the adsorbent based on the information received from said sensor means and sending a signal to the regeneration process condition control means to modify the process conditions to accord with the calculated conditions.

* * * * *